United States Patent
Kawamata et al.

(10) Patent No.: US 7,128,327 B2
(45) Date of Patent: Oct. 31, 2006

(54) AXLE WITH RUBBER CUSHION

(75) Inventors: Satoru Kawamata, Tokyo (JP); Yasuhiro Suzuki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 305 days.

(21) Appl. No.: 10/481,058

(22) PCT Filed: Jun. 21, 2002

(86) PCT No.: PCT/JP02/06228

§ 371 (c)(1),
(2), (4) Date: Dec. 17, 2003

(87) PCT Pub. No.: WO03/000511

PCT Pub. Date: Jan. 3, 2003

(65) Prior Publication Data

US 2004/0160033 A1   Aug. 19, 2004

(30) Foreign Application Priority Data

| Jun. 21, 2001 | (JP) | ............................. 2001-188383 |
| Jun. 21, 2001 | (JP) | ............................. 2001-188384 |
| Jun. 21, 2001 | (JP) | ............................. 2001-188385 |
| Jun. 21, 2001 | (JP) | ............................. 2001-188386 |

(51) Int. Cl.
*B60G 21/05* (2006.01)

(52) U.S. Cl. ....................... 280/124.106; 280/124.177; 280/124.153; 267/257

(58) Field of Classification Search ......... 280/124.106, 280/124.107, 124.116, 124.128, 124.153, 280/124.166, 124.169, 124.177; 267/257, 267/258, 292; *B60G 9/04*
See application file for complete search history.

(56) References Cited

U.S. PATENT DOCUMENTS 5,899,470 A * 5/1999 Heitzmann ............. 280/86.751
6,523,843 B1 * 2/2003 Wiesemann et al. .. 280/124.107

FOREIGN PATENT DOCUMENTS

| FR | 2621277 A | * | 4/1989 |
| JP | 52037649 A | * | 3/1977 |
| JP | 04287708 A | * | 10/1992 |
| JP | 2000025438 A | * | 1/2000 |

* cited by examiner

*Primary Examiner*—Paul N. Dickson
*Assistant Examiner*—Tiffany Webb
(74) *Attorney, Agent, or Firm*—Sughrue Mion, PLLC

(57) ABSTRACT

A torsion beam type suspension device comprises a pair of trailing arms (1) spaced from each other axially of an axle and connected at front ends thereof to a car body and at rear ends thereof rotatably supporting wheels through brackets, and a torsion beam (2) extending axially of the axle and interconnecting the pair of trailing arms (1) by connecting portions (6) at both ends, the rear ends of the pair of trailing arms (1) being connected to the brackets (8) through rubber cushions, whereby the steering stability can be improved without raising problems about cost, weight and space or without impairing NVH performance associated with road noise, trembling feeling and harshness.

8 Claims, 13 Drawing Sheets

FORWARD OF VEHICLE BODY

FORWARD OF VEHICLE BODY

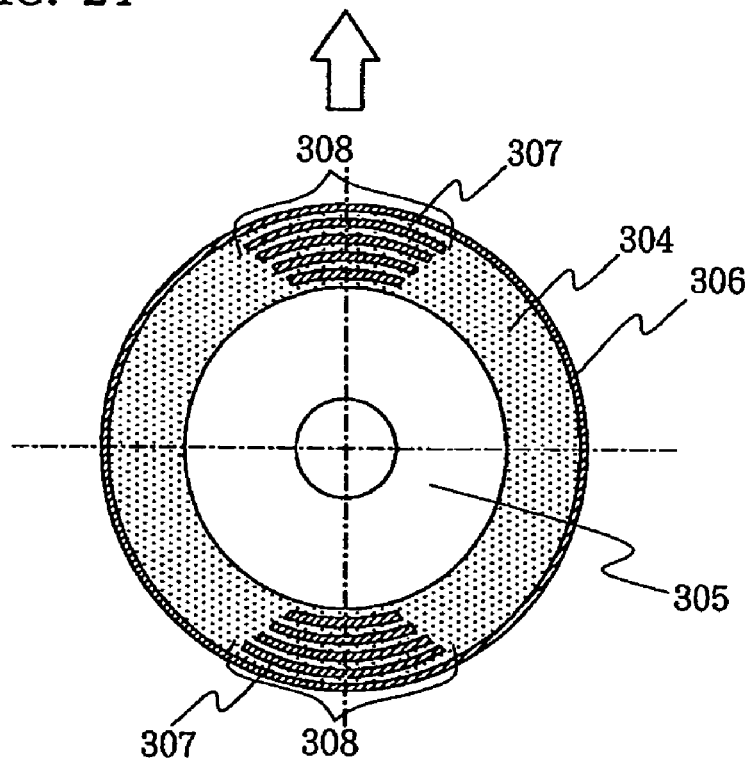
FIG. 24  FORWARD OF VEHICLE BODY
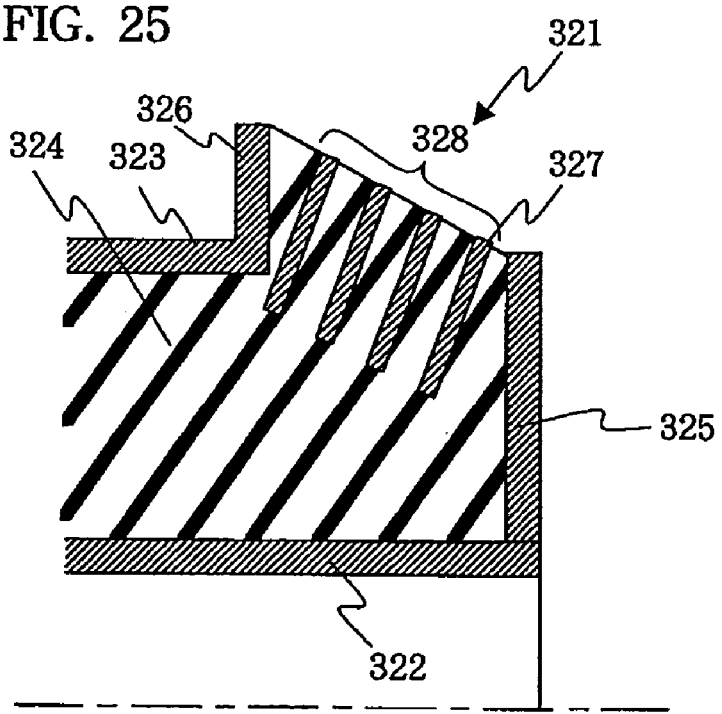
FIG. 25

PRIOR ART
FIG. 28
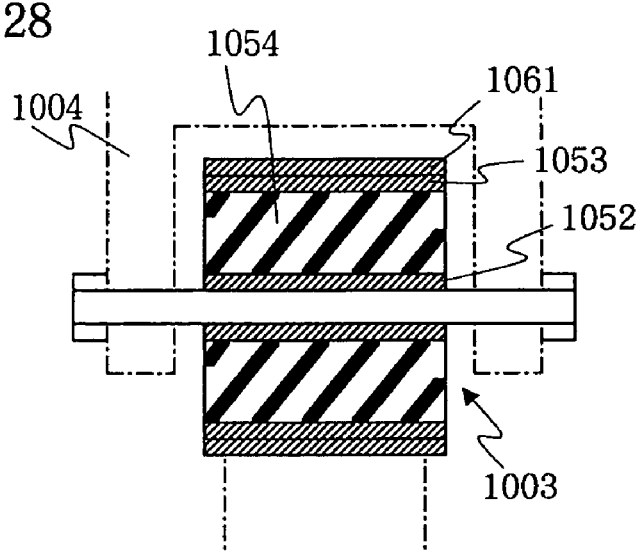
PRIOR ART
FIG. 29
FORWARD OF VEHICLE BODY
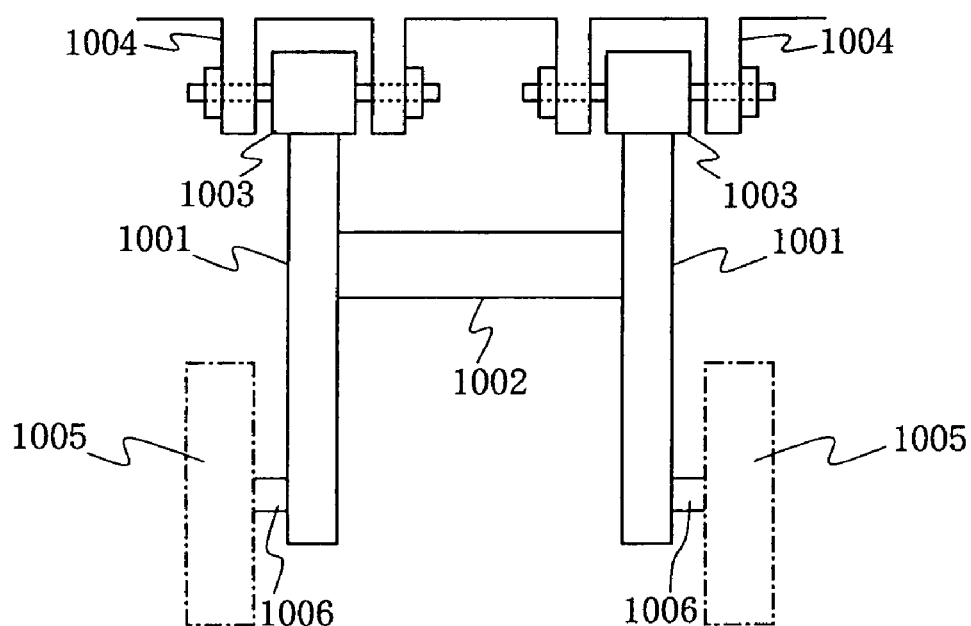

AXLE WITH RUBBER CUSHION

TECHNICAL FIELD

The present invention relates to a torsion beam type suspension device, and more specifically, it relates to a torsion beam type suspension device to improve the steering stability and the ride quality performance without impairing characteristic requests about cost, weight and space. Further, the present invention relates to an axle with rubber cushions and a torsion beam axle type suspension device using it, and more specifically, it relates to an axle with rubber cushions to improve the steering stability and the ride quality performance without impairing characteristic requests about cost, weight and space, and a torsion beam axle type suspension device using it. Still further, the present invention relates to a vibration isolating bush and a torsion beam axle type suspension device using it, and more specifically, it relates to a torsion beam axle type suspension device to improve the steering stability and the ride quality performance without impairing characteristic requests about cost, weight and space.

BACKGROUND ART

Various kinds of torsion beam type suspension devices have been known as a rear suspension device of FF cars. This device comprises a pair of trailing arms fitted to right and left rear wheels, and a torsion beam to connect these trailing arms to each other. The trailing arms are pivotably supported by connecting a vibration isolating bush provided on a front end to a bracket of a car body in a rocking manner or by a toe-control link.

On the other hand, a wheel is supported rotatably by an axle fixed in the right-to-left direction of the car body through the fixed brackets at rear ends of the trailing arms. The brackets have been fixed to the trailing arms by welding or the like.

In recent years, the rear suspension device of high-class FF cars has been transferred from, so called, a rigid axle type and a torsion beam type to a double wishbone type or a multi-link type, and more sophisticated steering stability and ride quality performance have been demanded.

On the other hand, for example, in a rear suspension device of small FF cars of 1,500 cc class, no structure to sufficiently satisfy the characteristic requests for the steering stability and the ride quality performance has been available from the reasons of cost, weight and space. However, in recent year, a rear suspension device to satisfy the steering stability and the ride quality performance while satisfying the characteristic requests about cost, weight and space has been demanded even for the rear suspension device of FF cars of this class.

Further, various kinds of torsion beam axle type suspension devices have been known as rear suspension devices of compact to medium FF cars. These torsion beam axle type suspension devices comprises a pair of trailing arms 1001 fitted to right and left rear wheels 1005 through axle parts 1006 as illustrated in FIG. 29, and a torsion beam 1002 to connect these trailing arms 1001 to each other. The trailing arms 1001 are connected to a bracket 1004 on a car body (not shown) in a rocking manner through vibration isolating bushes 1003 provided on front ends. As shown in FIG. 28, the vibration isolating bushes 1003 is press-fitted in and fixed to a cylindrical opening part 1061 formed axially of an axle at front ends of the trailing arms, and in a structure thereof, a rubber elastic body 1054 of a predetermined thickness is vulcanization-bonded between outer cylinder 1053 and an inner cylinder 1052 which are concentric with each other. A suspension device having the vibration isolating bushes has a large number of advantages such as low cost, space saving and lightweightness.

However, this torsion beam axle type suspension device is basically connected to a car at two front end points of the pair of trailing arms, and the steering stability, the traveling stability, and the vibrational ride quality performance by vibration isolation bushes have been compatibly difficult. In other words, in the conventional torsion beam axle type suspension device, the toe change to the cornering force in the turn and to the braking force is in the toe-out trend on the turning outer wheel side, and is in a negative direction for the traveling stability of the car. In order to suppress the toe change, the rigidity of the vibration isolating bushes, in particular, the rigidity in the rotational direction around the transverse axis and the perpendicular axis has to be increased. On the other hand, from the aspect of the vibrational ride quality performance, it has been effective to reduce the rigidity, in particular, the rigidity in the longitudinal direction and the vertical direction. However, there has been a limit to satisfy every rigidity in each direction with the vibration isolating bushes at a pivot point, and each performance cannot be considerably improved, or performed compatibly.

Thus, an object of the present invention is to provide a torsion beam type suspension device to improve the steering stability and the ride quality performance without impairing characteristic requests about cost, weight and space.

Another object of the present invention is to provide an axle with rubber cushions for compatibly performing the steering stability, the traveling stability and the vibrational ride quality performance without impairing characteristic requests about cost, weight and space, and a torsion beam axle type suspension device using it.

Still another object of the present invention is to provide vibration isolating bushes for compatibly performing the steering stability, the traveling stability and the vibrational ride quality performance without impairing characteristic requests about cost, weight and space, and a torsion beam axle type suspension device using it.

DISCLOSURE OF INVENTION

The inventors of the present invention earnestly considered the above problems, and found out that the above objects can be achieved by the configuration shown below, and completed the present invention.

In other words, according to a torsion beam type suspension device of the present invention, the torsion beam type suspension device comprises a pair of trailing arms spaced from each other axially of the axle, and connected to a car body at front ends, and rotatably supporting wheels at rear ends through brackets, and a torsion beam extending axially of the axle and interconnecting the pair of trailing arms at both ends, the rear ends of the pair of trailing arms are connected to the brackets through rubber cushions. The steering stability can be improved without raising problems about cost, weight and space or without impairing NVH performance associated with road noise, trembling feeling and harshness.

In the above torsion beam type suspension device of the present invention, at least two of the rubber cushions are preferably disposed in the longitudinal direction at the rear ends of the trailing arms, and the rigidity of the rubber cushion disposed forward is preferably set to be lower than the rigidity of the rubber cushion disposed backward.

Further, the rubber cushions are preferably interposed between an outer cylinder and an inner cylinder concentric with each other, and constitute the vibration isolating bushes. In this case, a pair of protruded parts are preferably protruded from front and rear parts of the brackets in the inward direction of the axle, two cylindrical opening parts continuously arranged axially of the axle are respectively formed in the pair of protruded parts in the longitudinal direction, the vibration isolating bushes are press-fitted in and fixed to these opening parts, the two cylindrical protruded parts extending from the trailing arms are penetrated through both inner cylinders of the front vibration isolating bush and the rear vibration isolating bush arranged in the longitudinal direction, the rigidity of the front vibration isolating bush is set to be lower than the rigidity of the rear vibration isolating bush, or the pair of protruded parts are protruded from front and rear parts of the brackets, the vibration isolating bushes are press-fitted in and fixed to the cylindrical opening parts in the longitudinal direction which are respectively formed in the pair of protruded parts, one cylindrical protruded part extending backward of the trailing arms is penetrated through both inner cylinders of the front vibration isolating bush and the rear vibration isolating bush arranged in the longitudinal direction, and the rigidity of the front vibration isolating bush is set to be lower than the rigidity of the rear vibration isolating bush.

In addition, a stopper is most preferably installed on both a root part and a tip part of the cylindrical protruded parts extending backward of the trailing arms. Still further, the axial direction of either of, or each of the front vibration isolating bush and the rear vibration isolating bush is preferably inclined to the longitudinal direction of the car.

In particular, the following operations and advantages are obtained in the above configuration. In other words, the front and rear inputs from a road surface are absorbed by the front vibration isolating bush and the rear vibration isolating bush, and further, by the stoppers, trembling feeling associated with the resonance under the spring coil can be excellently controlled by the damping of the front and rear stoppers. Further, road noise and brake noise can be double-controlled by the front vibration isolating bush and the rear vibration isolating bush.

Still preferably, the front ends of the trailing arms are connected to the brackets on the car body in a rocking manner through the vibration isolating bushes, and the rigidity of the vibration isolating bushes at the front ends of the trailing arms can be enhanced, and as a result, the durability of the vibration isolating bushes can be enhanced thereby. In addition, by setting the rigidity of the rear vibration isolating bush to be higher than the rigidity of the front vibration isolating bush, the brackets on the floating condition are inclined on the toe-in side even when the torsion beam body is slightly twisted to the toe-out side by the cornering force, and the toe-in can be realized on the whole in the spring in the right-to-left direction of the car. In this case, as described above, the rigidity of the vibration isolating bushes at the front ends of the trailing arms can be enhanced, and the twisting deformation itself can also be suppressed.

Further, the inventors of the present invention earnestly performed consideration to solve the above problems, found that the above-described objects can be achieved by the following configuration, and completed the present invention.

In other words, the axle with rubber cushions of the present invention comprises a spindle part, a disk body with the spindle part fixed to an outer surface thereof, and a fitting plate to the trailing arms, a cylindrical protruded part is protruded from an inner side of the disk body, a spherical part is provided on a tip part thereof, a spherical bearing to pivotably support the spherical part in a freely angular manner is disposed on the fitting plate, and the rubber cushions to elastically support the disk body and the fitting plate are disposed at least on a part around the cylindrical protruded parts and the spherical bearing. Accordingly, in the torsion beam axle type suspension device of the present invention using the axle with rubber cushions of the present invention, the vibration isolating property can be demonstrated by the rubber cushions fitted to the axle part without raising problems about cost, weight and space, the vibrational ride quality performance can be improved, the axle is supported by the presence of the spherical bearing, the shear input applied to the rubber cushions can be suppressed, and the durability of the rubber cushions is not impaired.

In the axle with rubber cushions of the present invention, the spherical bearing is preferably offset backward of the spindle part, and the spherical bearing is also preferably fitted to a mount fixed to the fitting plate. Further, the rigidity of the rubber cushions is preferably set to be lower at a forward part of the car than the rigidity at a rear part of the car, in particular, metal plates and the rubber cushions are laminated on the rubber cushions at a rear part of the car to form a laminate structural body, or the rubber cushions are divided into two in the longitudinal direction of the car, and the rigidity of the two-divided rubber cushions is preferably set to be lower on the forward side than that on the rear side.

In the above configuration, the torsion beam body is twisted to the toe-out side by the cornering force, the toe-out trend is suppressed on the turning outer wheel, and the toe-in trend can be realized on the whole.

Further, a pair of engagement members are installed respectively on an outer edge part of the disk body and the fitting plate at the car rear side of the rubber cushions. When the disk body is rotated when the braking torque is generated, the engagement members are engaged with each other, and the disk body is preferably pushed outward of the axle at the engagement part. Accordingly, the toe-in can be positively realized by the engagement members when the braking torque is generated.

According to the torsion beam axle type suspension device of the present invention, the torsion beam axle type suspension device comprises a pair of trailing arms spaced from each other axially of the axle, and connected at the front ends thereof to a car body, and rotatably supporting wheels by rear ends thereof, and a torsion beam extending axially of the axle and interconnecting the pair of trailing arms by connection parts at both ends, and either of the axle with rubber cushions of the present invention is fitted to the rear ends of the trailing arms. Accordingly, the above-described effect, i.e., the vibration isolating property is demonstrated by the rubber cushions fitted to the axle part without raising problems about cost, weight and space, the vibrational ride quality performance is improved, the axle is supported by the presence of the spherical bearing, the shear input applied to the rubber cushions can be suppressed, and the torsion beam axle type suspension device can be obtained without impairing the durability of the rubber cushions.

In addition, the inventors of the present invention earnestly performed consideration to solve the above problems, found that the above-described objects can be achieved by the following configuration, and completed the present invention.

In other words, an axle with rubber cushions according to another embodiment of the present invention comprises a spindle part, a support plate with the spindle part fixed to an outer surface thereof, a pair of shaft parts protruded from upper and lower surfaces of the support plate, and a pair of arms to pivotably support the shaft part, and the rubber cushions are disposed on an inner surface of the support plate. Accordingly, in the torsion beam axle type suspension device using the axle with rubber cushions of the present invention, the vibration isolating property is demonstrated by the rubber cushions fitted to the axle part without raising problems about cost, weight and space, the vibrational ride quality performance is improved, the shear input applied to the rubber cushions can be suppressed, and the durability of the rubber cushions is not impaired.

In the above axle with rubber cushions, the pair of shaft parts are preferably offset backward of the spindle part. Accordingly, even when the torsion beam body is twisted to the toe-out side by the cornering force, the toe-out trend can be suppressed by the turning outer wheel, and the toe-in can be realized on the whole.

Further, another axle with rubber cushions of the present invention comprises a spindle part, a support plate with the spindle part fixed to an outer surface thereof, a shaft part supported in the vertical direction at rear ends of the support plate, and at least one arm to pivotably support the shaft part, and rubber cushions are disposed on an inner surface of the support plate.

In the above axle with rubber cushions, the rigidity of the rubber cushions is preferably set to be lower in a forward part of the car than the rigidity in a rear part thereof, metal plates and the rubber cushions are preferably laminated on the rubber cushions at a rear part of the car to form a laminate structural body. Further, the rubber cushions are divided into two parts, i.e., a forward part and a rear part with respect to the car, and the rigidity of the two-divided rubber cushions is preferably set to be lower on the forward side than that on the rear side.

In the above configuration, even when the torsion beam body is twisted to the toe-out side by the cornering force, the toe-out trend is suppressed by the turning outer wheel, and the toe-in can be realized on the whole.

In addition, the shaft part is preferably and pivotably supported through the rubber cushions. Accordingly, the vibration isolating property by the vibration isolating bushes can be demonstrated, and the vibrational ride quality performance can be substantially double-improved at the axle part.

According to another torsion beam axle type suspension device of the present invention, the torsion beam axle type suspension device comprises a pair of trailing arms spaced from each other axially of the axle, and connected to a car body at front ends, and rotatably supporting wheels at rear ends, and a torsion beam extending axially of the axle and interconnecting the pair of trailing arms by connection parts at both ends, and either of the above axle with rubber cushions of the present invention is fitted to the rear ends of the trailing arms. Accordingly, the above effect, i.e., the vibration isolating property is demonstrated by the rubber cushions fitted to the axle part without raising problems about cost, weight and space, the vibrational ride quality performance can be improved, the shear input applied to the rubber cushions can be suppressed, and the torsion beam axle type suspension device can be obtained without impairing the durability of the rubber cushions.

Still further, the inventors of the present invention earnestly performed consideration to solve the above problems, found that the above-described objects can be achieved by the following configuration, and completed the present invention.

In other words, according to the vibration isolating bush of the present invention, flanges are provided on one end of the same side of the inner cylinder and the outer cylinder with a rubber elastic body interposed between the outer cylinder and the inner cylinder concentric with each other in the vibration isolating bush with the inner cylinder extending outward of the outer cylinder in the concentric and axial direction, and at least a part of the rubber elastic body present in a space between these flanges forms a laminate structural body of metal plates and the rubber elastic body. Accordingly, the ratio of the rigidity in the shear direction (the direction orthogonal the lamination) of the laminate structural body formed of the metal plates and the rubber elastic body to the rigidity in the axial direction (the direction of lamination) is considerably higher than that of a single rubber elastic body. By employing this structural body in a part of the vibration isolating bush, the ratio of the rigidity in the longitudinal direction to the rigidity around the right-to-left axis and the perpendicular axis can be considerably larger than that of the vibration isolating bushes formed of a conventional single rubber elastic body.

Accordingly, in the vibration isolating bushes which are applied to connection parts of front ends of the trailing arms to the car body with the number of lamination of metal plates being at least two, the toe change in the toe-out trend can be suppressed on the turning outer wheel side to the cornering force without degrading the vibrational ride quality performance.

In the vibration isolating bush of the present invention, the metal plates are preferably inclined outward of the normal direction of the concentric axis, and in particular, a part of the flange of the inner cylinder is preferably inclined at the same angle as that of the metal plates, and a part of the flange of the outer cylinder is preferably inclined outwardly at the same angle as that of a part of the flange of the inner cylinder and the metal plates. Accordingly, by inclining the laminate structural part of the metal plates and the rubber elastic body, in the torsion beam axle type suspension device with these vibration isolating bushes applied to the connection parts of the front ends of the trailing arms to the car body, the upward pulling component applied to prevent the force applied to the toe-out trend is easily worked by the inclination in the turning outer wheel, and the toe change to the cornering force can be positively suppressed.

Further, the number of lamination of the metal plates is preferably at least two. Accordingly, by changing the number of lamination of the metal plates, the ratio of the rigidity in the longitudinal direction to the rigidity around the right-to-left and perpendicular axis can be adjusted to an optimum range.

Further, according to a torsion beam axle type suspension device of the present invention, the torsion beam axle type suspension device comprising a pair of trailing arms spaced from each other axially of the axle, connected to a car body at front ends, and rotatably supporting wheels at rear ends through brackets, and a torsion beam extending axially of the axle and interconnecting the pair of trailing arms by connection parts at both ends, the front ends of the trailing arms are connected to the brackets on the car body in a rocking manner through either of the vibration isolating bushes of the present invention. Accordingly, when the vibration isolating bushes of the present invention with the laminate structural part of the metal plates and the rubber elastic body inclined thereto are applied to the connection parts of the front ends of the trailing arms and the car body, the upward pulling component applied to prevent the force applied to the toe-out trend is easily worked by the inclination in the turning outer wheel, and the toe change to the cornering force can be positively suppressed.

BRIEF DESCRIPTION OF THE DRAWINGS

FIG. 24 is a side view of the vibration isolating bush shown in FIG. 23.

FIG. 25 is a sectional view of a vibration isolating bush according to another embodiment of the present invention.

FIG. 28 is a sectional view of a conventional vibration isolating bush.

FIG. 29 is a schematic view of a torsion beam axle type suspension device.

BEST MODE FOR CARRYING OUT THE INVENTION

The embodiments of the present invention will be described below.

Figure 1:
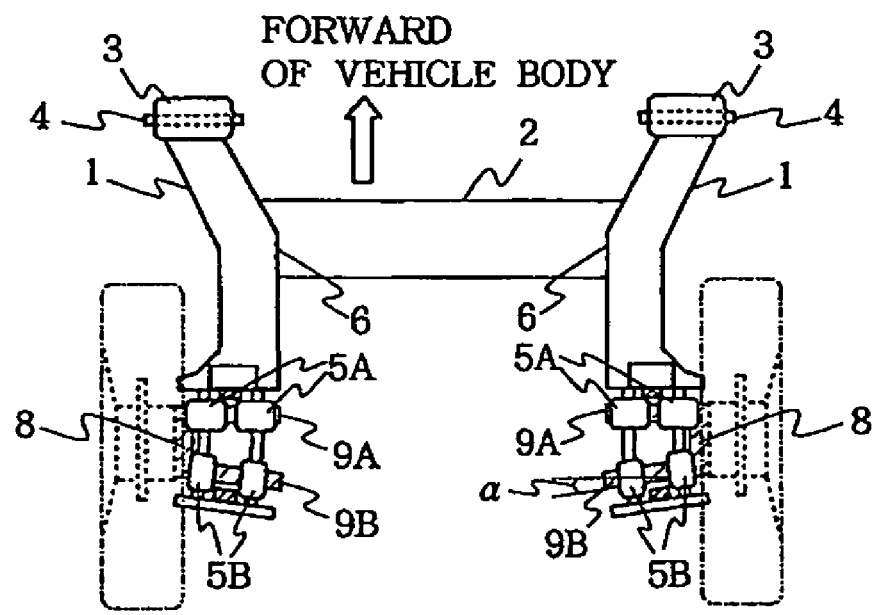
FIG. 1(a) is a schematic plan view of a torsion beam type suspension device according to an embodiment of the present invention.
FIG. 1(b) is a schematic rear view of the torsion beam type suspension device according to an embodiment of the present invention.
Figure 1:
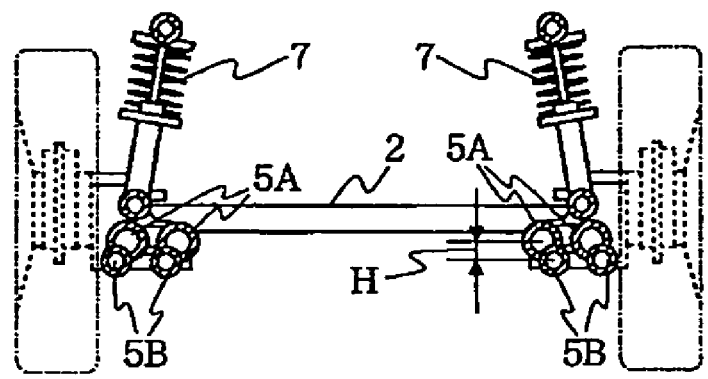

In a torsion beam type suspension device according to an embodiment of the present invention schematically shown in FIGS. 1(a) and 1(b), front ends of a pair of trailing arms 1 spaced from each other axially of the axle are connected to a car body (not shown). More specifically, a vibration isolating bush 3 with a rubber elastic body interposed between an outer cylinder and an inner cylinder concentric with each other is press-fitted in and fixed to an axle direction cylindrical part at the front ends of the trailing arms 1, and a shaft body 4 of a bracket of the car body, for example, a bolt, is penetrated through the inner cylinder of this vibration isolating bush 3. The trailing arms 1 and the car body is connected to each other in a rocking manner. Here, in the present invention, the rigidity of the vibration isolating bush 3 can be increased by disposing a front vibration isolating bush 5A and a rear vibration isolating bush 5B which will be described later, the durability of this vibration isolating bush 3 can be enhanced, and the torsional deformation itself by the cornering force can also be suppressed.

The torsion beam 2 extends axially of the axle, and substantially center parts of the pair of trailing arms 1 are connected to each other by connection parts 6 on both ends by welding or the like. A spring coil 7 is disposed on rear ends of the trailing arms 1, and a bracket 8 to support wheels is disposed thereon. In the present invention, a conventional structure can be employed for a basic structure of the trailing arms 1, the torsion beam 2, and the spring coil 7, and the basic structure is not limited.

Figure 2:
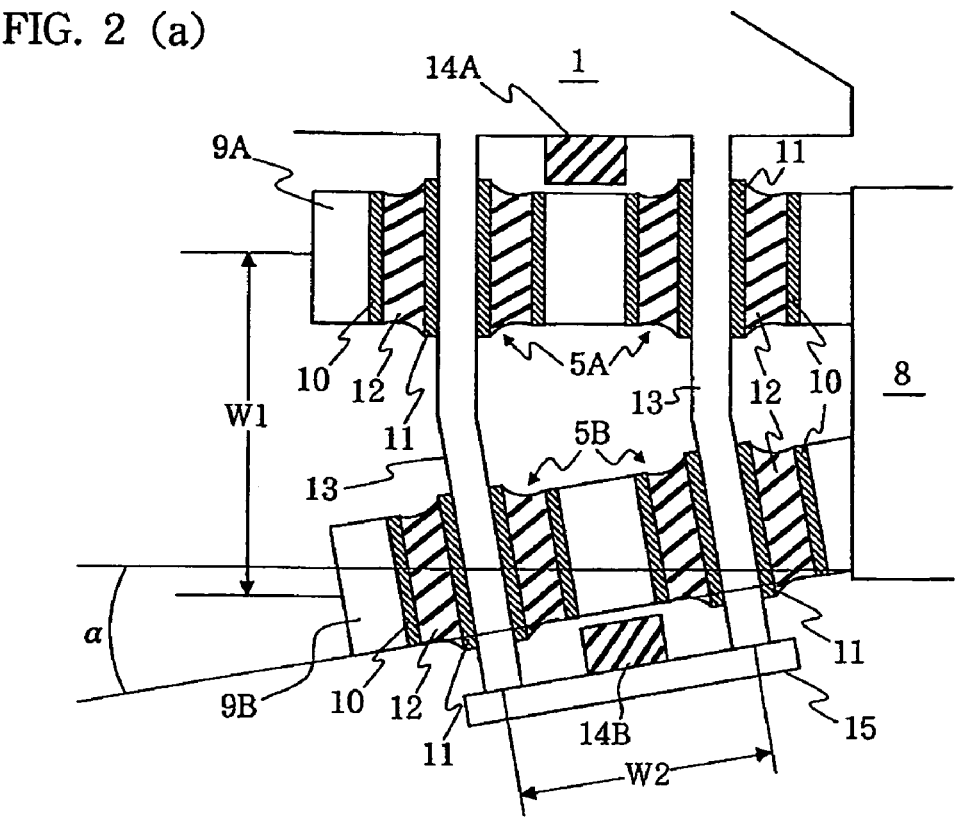
FIGS. 2(a) and 2(b) are expanded sectional view of preferred examples of rear ends of trailing arms and a rocking connection part of a bracket, respectively.
Figure 2:
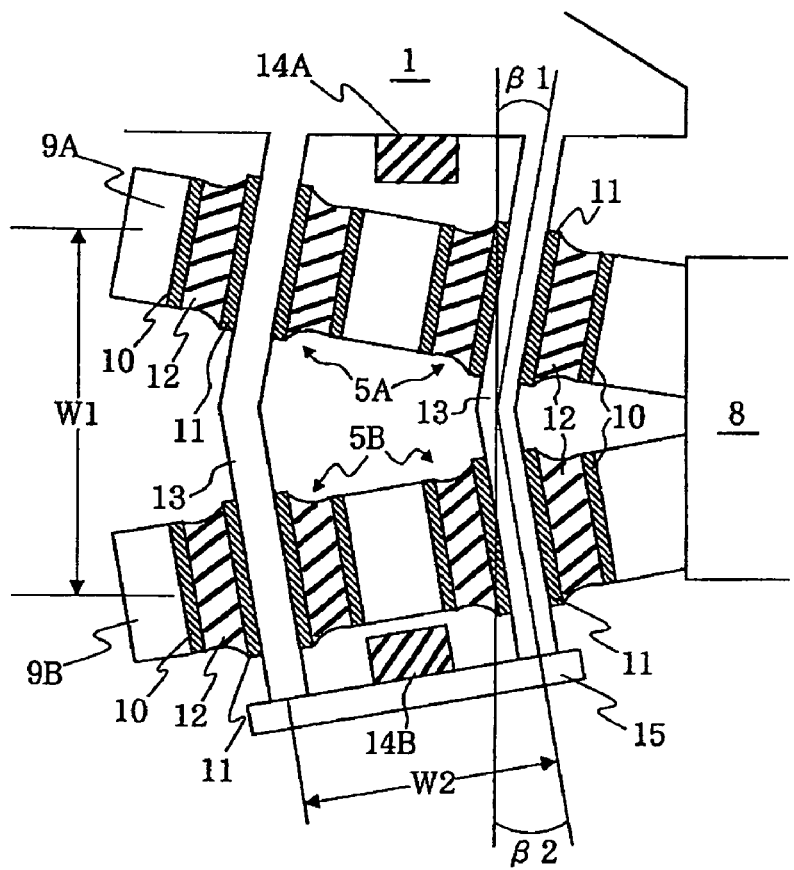

FIG. 2 shows an expanded view of a preferred example of such connection part of the rear ends of the trailing arms 1 to the bracket 8 that they can be connected in according manner. In the torsion beam type suspension device of one preferred example of the present invention, shown in FIG. 2(a), a pair of protruded parts 9A and 9B are extruded from the front and rear ends of the bracket 8, in the inward direction of the axle, and the vibration isolating bushes 5A and 5B with a rubber elastic body 12 interposed between the outer cylinder 10 and the inner cylinder 11 concentric with each other is press-fitted in and fixed to two cylindrical opening parts which are continuously arranged axially of the axle.

Two cylindrical protruded parts 13 extending backwardly from the trailing arms 1 are respectively penetrated in both inner cylinders 11 of the front vibration isolating bush 5A and the rear vibration isolating bush 5B which are in the longitudinally positional relationship. In the present invention, it is important to set the rigidity of the front vibration isolating bush 5A to be lower than the rigidity of the rear vibration isolating bush 5B by changing the thickness of the rubber elastic body 12, or the like. Even when the cornering force is applied, and the body of the torsion beam 2 is twisted slightly to the toe-out side, the bracket 8 in floating condition is inclined to the toe-in side, and the toe-in can be realized on the whole.

Stoppers 14A and 14B are installed on both a root part and a tip part of the cylindrical protruded part 13 extending backwardly from the trailing arms 1. The material of the stoppers 14A and 14B may be urethane foam in addition to the rubber cushions. The stopper 14B at the tip part is installed with a plate-like member 15 stretched over the tip parts of a pair of cylindrical protruded parts 13, and with the substantially center part facing the protruded part 9B. Therefore, the front and rear inputs from a road surface are absorbed by the front vibration isolating bush 5A and the rear vibration isolating bush 5B, and further by the stoppers 14A and 14B, and trembling feeling associated with the resonance under the spring coil 7 can be controlled by the damping of the front and rear stoppers 14A and 14B. As a result, road noise and brake noise can be double-controlled.

Figure 3:
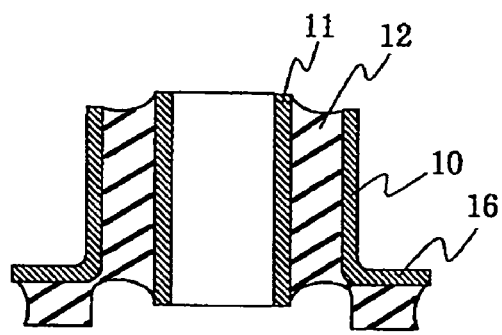
FIG. 3 is a sectional view of a vibration isolating bush with a stopper.

Alternatively, in place of providing the stoppers 14A and 14B, a vibration isolating bush shown in FIG. 3 may be used as the vibration isolating bushes 5A and 5B. In the vibration isolating bushes shown in FIG. 3, the outer cylinder 10 has a flange 16, the rubber elastic body 12 is provided also on the flange 16 so as to give the function as the stopper to the rubber elastic body 12 of this part.

In the present invention, as shown in the figure, the rigidity of the front vibration isolating bush 5A is preferably set to be lower than the rigidity of the rear vibration isolating bush 5B, and the axial direction of the rear vibration isolating bush 5B is preferably offset (inclined) with respect to the axle, and the offset angle to the axle is preferably 20° to 50°. The toe-in control during the braking can be performed excellently. In addition, in order to ensure the rigidity of a caster, the width W1 between the front vibration isolating bush 5A and the rear vibration isolating bush 5B is preferably large, and the larger the width is, the more the upper and lower loads on the vibration isolating bushes 5A and 5B are reduced, resulting in favorable durability characteristic. If the width W1 in the longitudinal direction cannot be realized from the structural limitation, the width WI may be ensured by providing a step H (refer to FIG. 1(b)) in a deviated manner in the vertical direction. In addition, in order to ensure the camber rigidity, the width W2 in the right-to-left direction of the vibration isolating bushes 5A and 5B is preferably large, and the larger the width is, the more the upper and lower loads on the vibration isolating bushes 5A and SB are reduced, resulting in favorable durability characteristic. If the width W2 in the right-to-left direction cannot be realized from the structural limitation, the width W2 may be ensured by deviating the right and left vibration isolating bushes in the vertical direction.

FIG. 2(b) shows another preferred example of a rocking connection part between the rear ends of the trailing arms and the bracket. In the example in the figure, the axial direction of both the front vibration isolating bush 5A and the rear vibration isolating bush 5B is inclined with respect to the longitudinal direction of the car. When the vibration isolating bushes 5A and 5B are disposed in this manner, the negative camber during the cornering is reduced, and the negative camber works during the braking. Thus, the toe-in control during the braking can be performed excellently because the transverse load is applied on the toe-in side. The angles of inclination β1 and β2 with respect to the longitudinal direction of the car are preferably 10° to 40°, and when these angles are smaller than 10°, sufficient effect by this arrangement cannot be obtained. On the other hand, if these angles exceed 40°, contact is generated between members when the car is driven, and the car cannot be practically used. β1 and β2 are preferably 30°, respectively, in terms of the toe-in control. However, due to the relationship of the car structure and the design of other members, these angles may be adequately set within the above range. In this case, the conditions on the width W1 between the front vibration isolating bush 5A and the rear vibration isolating bush 5B and the width W2 in the right-to-left direction of the vibration isolating bushes 5A and 5B are similar to those of the preferred example shown in FIG. 2(a).

Figure 4:
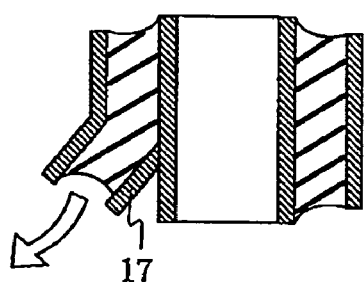
FIG. 4 is a sectional view of a vibration isolating bush with a metal piece.

In addition, if the load backward of the car is applied to the rear vibration isolating bush 5B, the bracket 8 in the floating condition is inclined to the toe-in side, and the brake toe-in is performed by providing, for example, a metal piece 17 on the rubber of the vibration isolating bush 5B as shown in FIG. 4 so as to be deformed outward of the car, and providing a metal piece (not shown) on the front vibration isolating bush so as to be deformed straight or inwardly without providing the metal piece 17.

In the vibration isolating bushes 3, 5A and 5B available in the present invention, the rubber elastic body 12 of the predetermined thickness is vulcanization-bonded between the outer cylinder 10 and the inner cylinder 11 concentric with each other. The basic structure and the material of the vibration isolating bushes 3, 5A and 5B may be those which are extensively employed in car suspensions, and the rubber elastic body 12 may be a known one as the rubber cushions. For example, the rubber elastic body can be prepared by adequately blending adequate compounding agents such as, sulfur, vulcanization accelerator, aging preventer and carbon black in natural rubber and synthetic rubber, such as diene rubber including butadiene rubber, styrene butadiene copolymer rubber, and butyl rubber. The JIS-A hardness (Hd) of these rubber elastic bodies is preferably 30° to 80° from the viewpoint of the vibration absorption characteristic and the durability, and the modulus of elasticity thereof is preferably $1 \times 10^3$ to $1 \times 10^5$ N/cm$^2$.

Figure 5:
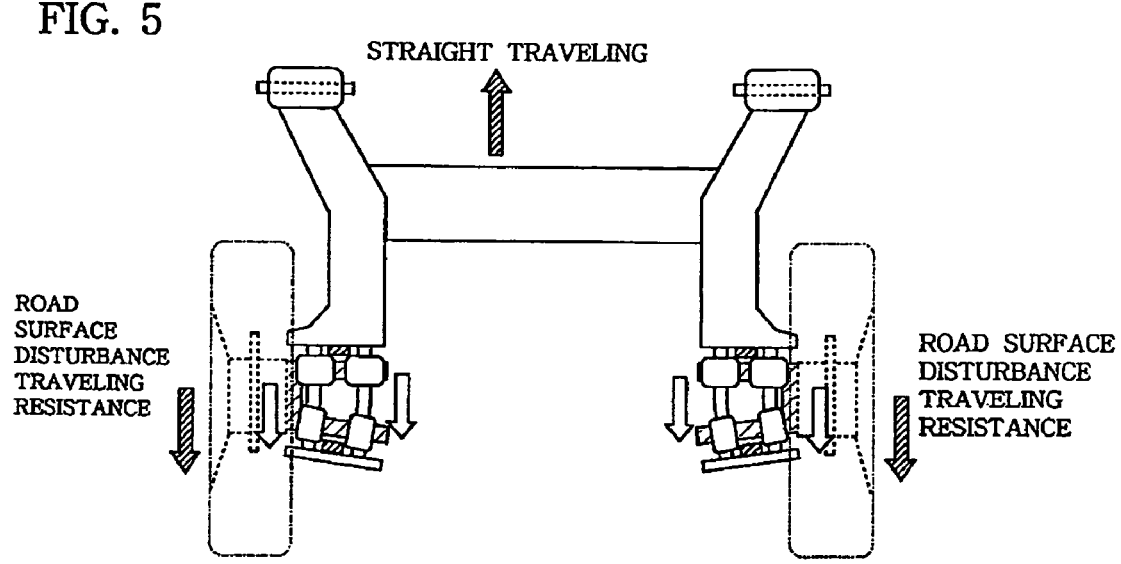
FIG. 5 is an illustration to indicate the input direction in the straight traveling, and the working direction of each member.
Figure 6:
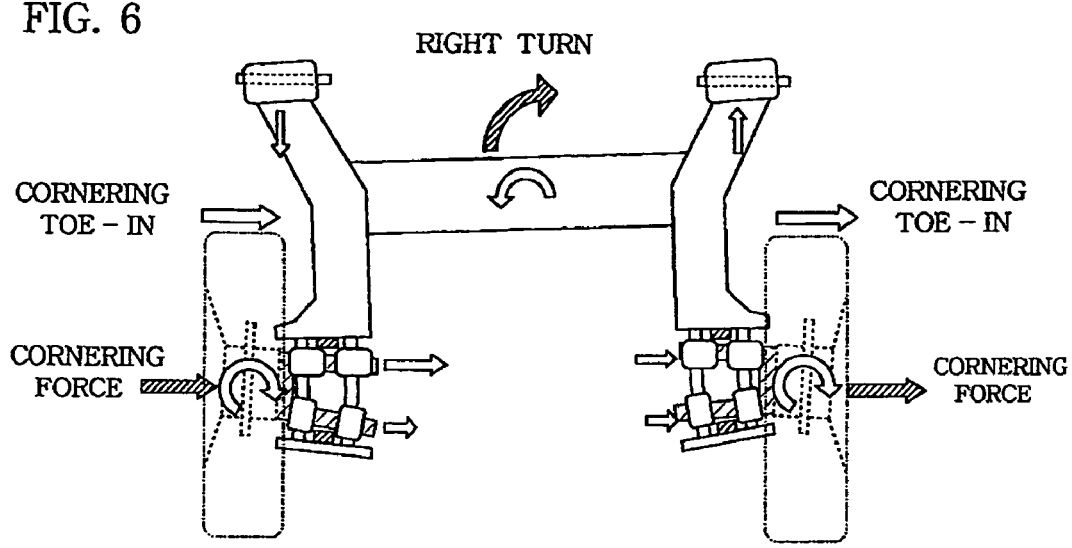
FIG. 6 is an illustration to indicate the input direction in the right turn, and the working direction of each member.
Figure 7:
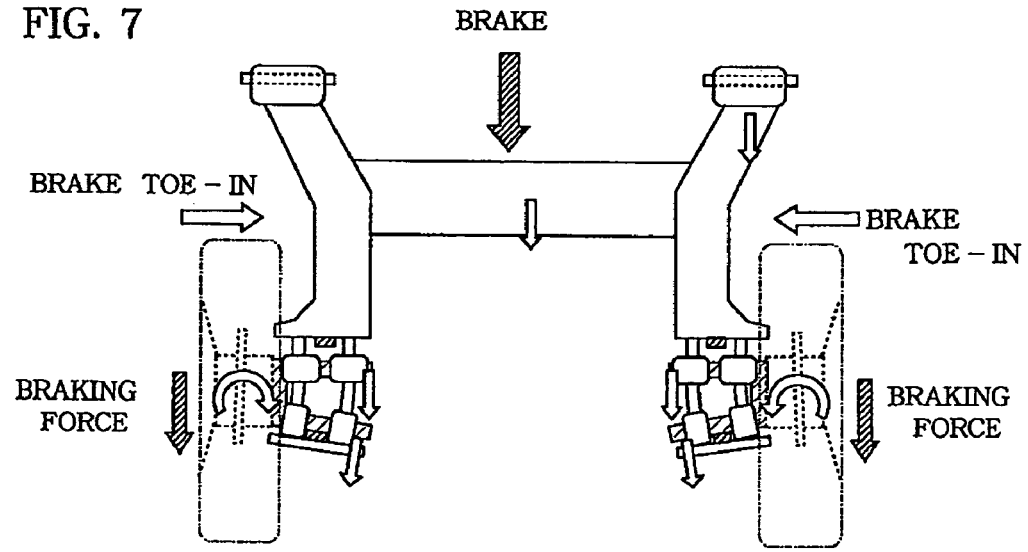
FIG. 7 is an illustration to indicate the input direction in the braking condition, and the working direction of each member.

FIGS. 5 to 7 show the working direction of each member (outline arrow) to the input (solid arrow) during the straight traveling, the right turn, and the braking of the torsion beam type suspension device which is the preferred embodiment of the present invention. During the straight traveling shown in FIG. 5, the car can travel without any inclination to the toe-in side or the toe-out side. In addition, during the right turn shown in FIG. 6, the bracket 8 in the floating condition is inclined to the toe-in side and the toe-in condition is performed on the whole even when the body of the torsion beam 2 is twisted slightly to the toe-out side by the cornering force. In addition, during the braking shown in FIG. 7, the rear vibration isolating bush 5B is deformed outward of the car when the load backward of the car is applied, and the front vibration isolating bush 5A is kept straight or deformed inwardly. Thus, the bracket 8 is inclined to the toe-in side to realize the brake toe-in.

Figure 8:
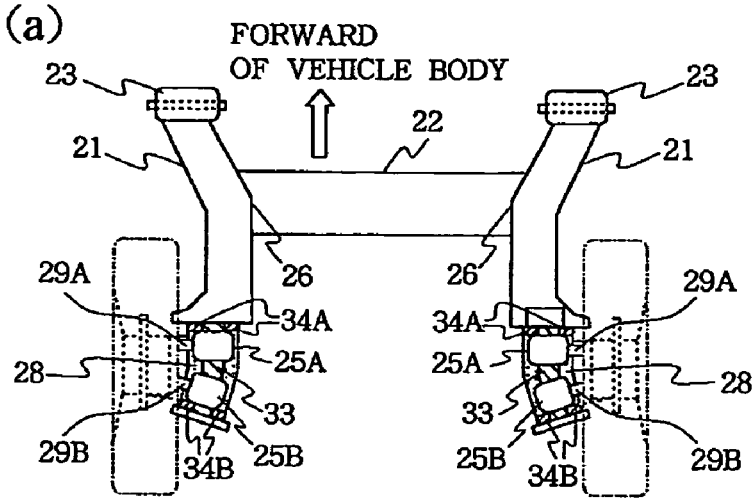
FIG. 8(a) is a schematic plan view of a torsion beam type suspension device according to another embodiment of the present invention.
FIG. 8(b) is a schematic rear view of the torsion beam type suspension device according to the embodiment of the present invention.
Figure 8:
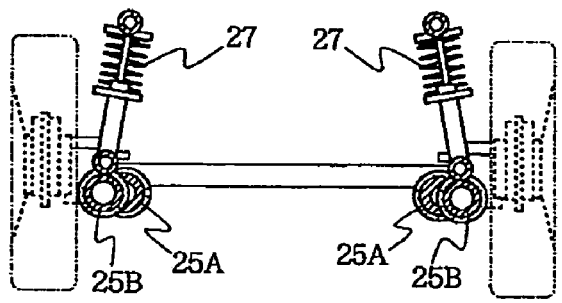

Next, another embodiment of the present invention will be described specifically. In the torsion beam type suspension device according to another embodiment of the present invention which is schematically shown in FIGS. 8(*a*) and 8(*b*), the basic structure of the trailing arms, the torsion beam, the spring coil or the like is similar to that of the above-described preferred embodiment. In other words, the front ends of a pair of trailing arms 21 spaced from each other axially of the axle are connected to the car body (not shown) in a rocking manner through vibration isolating bushes 23. The torsion beam 22 extends axially of the axle, and interconnects the pair of trailing arms 21 by connecting the substantially center portions by connection parts 26 at both ends by welding, or the like. A spring coil 27 is disposed on rear ends of the trailing arms 21, and a bracket 28 to support wheels is disposed thereon.

In the preferred embodiment of the present invention shown in FIG. 8, a pair of protruded parts 29A and 29B are protruded inward of the axle from the front and rear parts of the bracket 28, one cylindrical opening part is formed respectively in the pair of protruded parts 29A and 29B, and similar to the above-described preferred embodiment, vibration isolating bushes 25A and 25B are press-fitted in and fixed to the cylindrical opening part.

One cylindrical protruded part 33 extending backwardly from the trailing arms 21 is penetrated in both inner cylinders of the front vibration isolating bush 25A and the rear vibration isolating bush 25B which are in the longitudinally positional relationship. In this condition, the rigidity of the front vibration isolating bush 25A is set to be lower than the rigidity of the rear vibration isolating bush 25B similar to the case of the above preferred embodiment. Therefore, even when the cornering force is applied, and the body of the torsion beam 22 is twisted slightly to the toe-out side, the bracket 28 in the floating condition is inclined to the toe-in side, and the toe-in can be realized on the whole.

Stoppers 34A and 34B are installed on both a root part and a tip part of a cylindrical protruded 33 extending backwardly from the trailing arms 21. The front and rear inputs from a road surface are absorbed by the front vibration isolating bush 25A and the rear vibration isolating bush 25*b*, and further, by the stoppers 34A and 34B, trembling feeling associated with the resonance under the spring coil 27 can be controlled by the damping of the front and rear stoppers 34A and 34B, and road noise and brake noise can be double-controlled.

Also, in this preferred embodiment, the offset of the axial direction of the rear vibration isolating bush 25B with respect to the axle, and the width W1 between the front vibration isolating bush 25A and the rear vibration isolating bush 25B are similar to those in the case of the above preferred embodiment.

In addition, in the present invention, though not shown in the figure, two front vibration isolating bushes and one rear vibration isolating bush may be provided, or, on the contrary, one front vibration isolating bush and two vibration isolating bushes may be provided.

Figure 9:
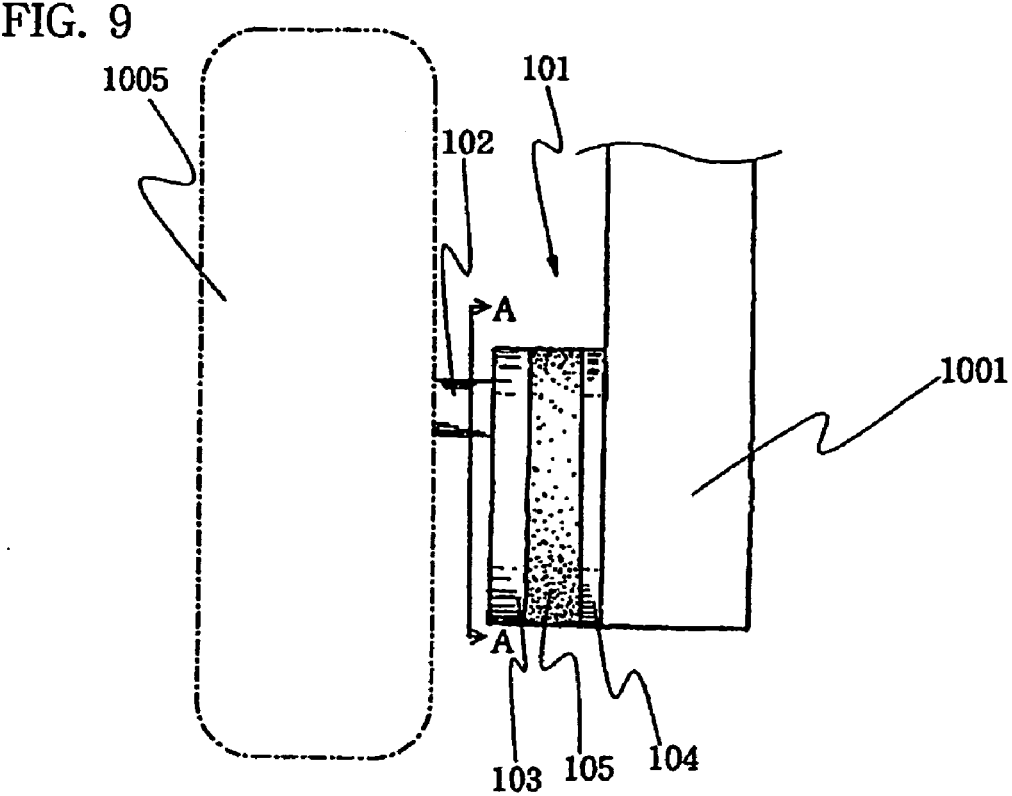
FIG. 9 is a frontal view of an axle with rubber cushions according to an embodiment of the present invention.

FIG. 9 shows an axle with rubber cushions according to an embodiment of the present invention. An axle with rubber cushions 101 according to the preferred embodiment shown in FIG. 9 comprises a metal spindle part 102, and a disk body 103 with the spindle part 102 fixed thereto. The spindle part 102 may be fixed to the disk body 103 by welding, screwing or press-fitting and fixing in a hole part formed in the disk body 103, or the spindle part and the disk body may be integrated with each other.

In the preferred embodiment shown in the figure, rubber cushions 105 to elastically support both parts are disposed between the disk body 103 and a fitting plate 104 to the trailing arms 1001. These rubber cushions 105 are bonded with the disk body 103 and the fitting plate 104 by means of vulcanization bonding, etc. The thickness of the rubber cushions 105 may be adequately selected considering the arrangement of an inner spherical bearing according to the space of the axle part and the requested vibration isolating characteristic.

The rubber cushions 105 available for the present invention can be a known one as the rubber cushions. For example, the rubber elastic body can be prepared by adequately blending adequate compounding agents such as, sulfur, vulcanization accelerator, aging preventer and carbon black in natural rubber and synthetic rubber, such as diene rubber including butadiene rubber, styrene butadiene copolymer rubber, and butyl rubber. The JIS-A hardness (Hd) of these rubber elastic bodies is preferably 30° to 80° from the viewpoint of the vibration absorption characteristic and the durability, and the modulus of elasticity thereof is preferably $1 \times 10^3$ to $1 \times 10^5$ N/cm$^2$.

Figure 10:
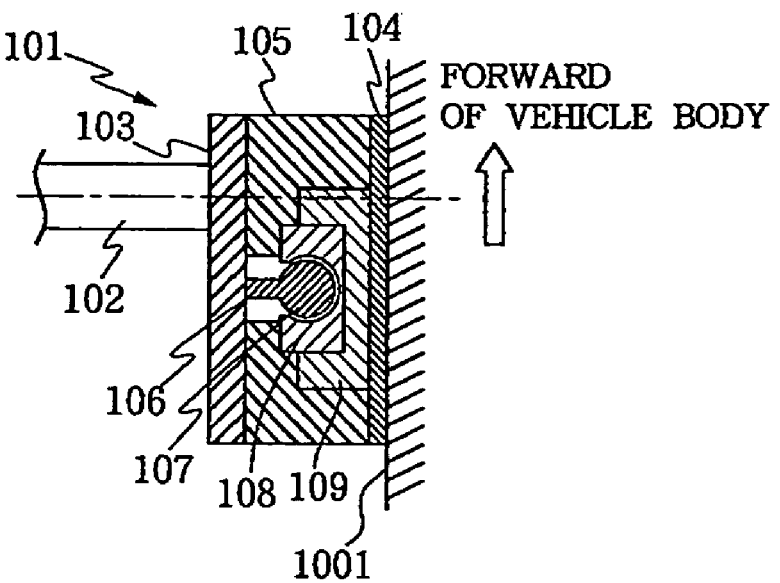
FIG. 10 is a sectional view along A—A direction shown in FIG. 9.

FIG. 10 is a sectional view in the arrow direction along A—A of the axle with rubber cushions 101 shown in FIG. 9. As shown in FIG. 10, a cylindrical protruded part 106 is protruded from an inner surface (a back side of a fitting surface of the spindle part 102) of the disk body 103 in a backwardly offset manner from the spindle part 102, and a spherical part 107 is provided on a tip part thereof. The spherical part 107 may be welded or screwed to a tip of the cylindrical protruded part 106, or may be integrated with the cylindrical protruded part 106. Further, the cylindrical protruded part 106 may be inclined in the longitudinal direction.

Figure 11:
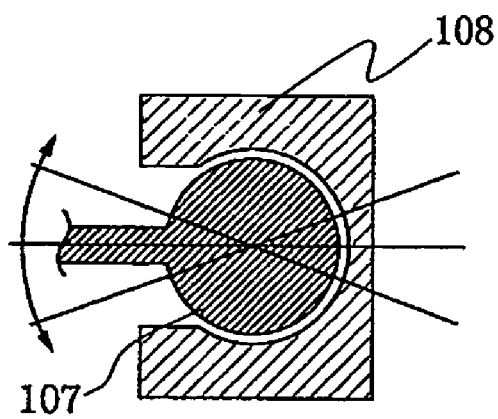
FIG. 11 is an expanded sectional view of fluctuation of a spherical bearing.

On the other hand, a mount 109 for fitting the spherical bearing is fixed to a surface of the fitting plate 104 opposite to an abutting surface on the trailing arms 1001 by means of screwing, welding, etc. The height of the mount 109 may be adequately determined according to the thickness in the axial direction of the rubber cushions 105, or the mount may be omitted. The spherical bearing 108 fixed to the mount 109 by means of screwing or the like pivotably supports the spherical part 107 at the tip of the cylindrical protruded part 106 in an angular-free manner. In other words, as shown in FIG. 11, the spherical part 107 supported by the spherical bearing 108 can be moved only in an angular-free manner while fixed in the vertical direction, the longitudinal direction and the right-to-left direction of the car.

By providing the above axle with rubber cushions 101 of the present invention on side surfaces of the trailing arms 1001, the vibration isolating property is demonstrated by the effect of the rubber cushions 105 without raising problems about cost, weight and space, and the vibrational ride quality performance is improved. In addition, the shear input working on the rubber cushions 105 can be suppressed, and the durability of the rubber cushions 105 is not impaired.

Figure 12:
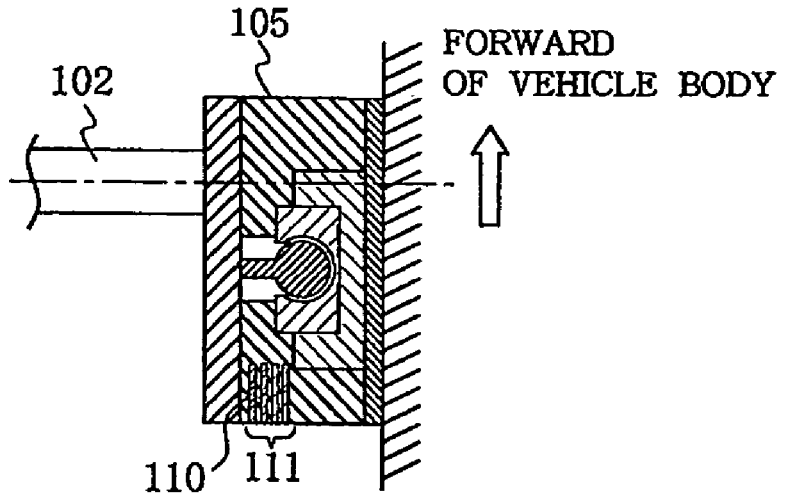
FIG. 12 is a sectional view along A—A direction shown in FIG. 9 according to another embodiment of the present invention.

In another preferred embodiment of the present invention, the rigidity of the rubber cushions 105 at the front side of the car is set to be lower than that at the rear side thereof. The toe-in can be positively performed during the cornering. More specifically, as shown in FIG. 12, a method is provided, in which a laminate structural body 111 is formed of a metal plate 110 and the rubber cushions 105 on the rubber cushions 105 at a rear part of the car. In an example shown in the figure, the number of laminates of the metal plate 110 is four. This number may be adequately selected according to the kind of the car or the like, and preferably two or more. Similarly, the size and the arrangement area of the metal plate 110 can be adequately selected according to a desired rigidity ratio to the front rigidity.

Figure 13:
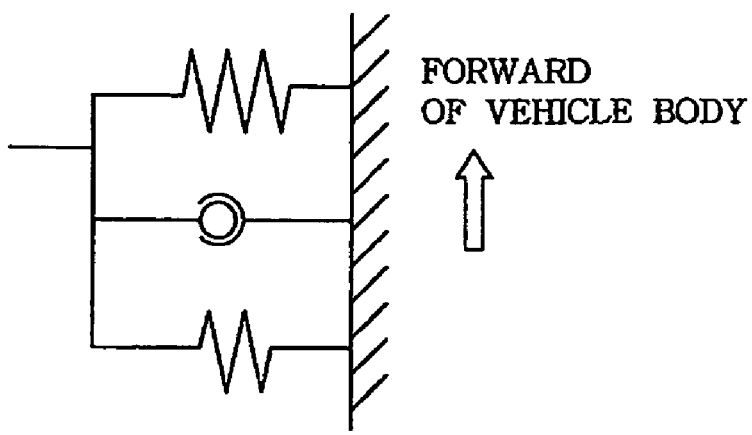
FIG. 13 is an illustration to show toe changes to the input of rubber cushions.
Figure 13:
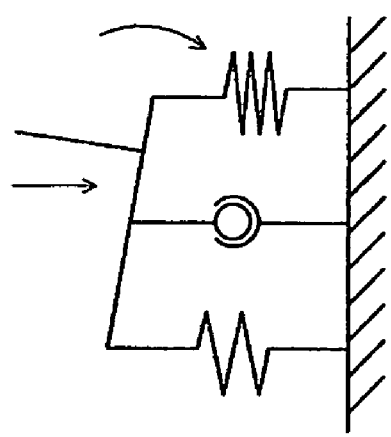

Here, the relationship of the toe change by offsetting the cylindrical protruded part 106 and the spherical bearing 108 backward of the car to the spindle part 102 is described as shown in FIG. 13. In other words, as shown in FIG. 13(a), if the input is given from the outside in the axial direction to the inside during the cornering when offset is performed, the front spring is more compressed as shown in FIG. 13(b), realizing the toe-in.

Figure 14:
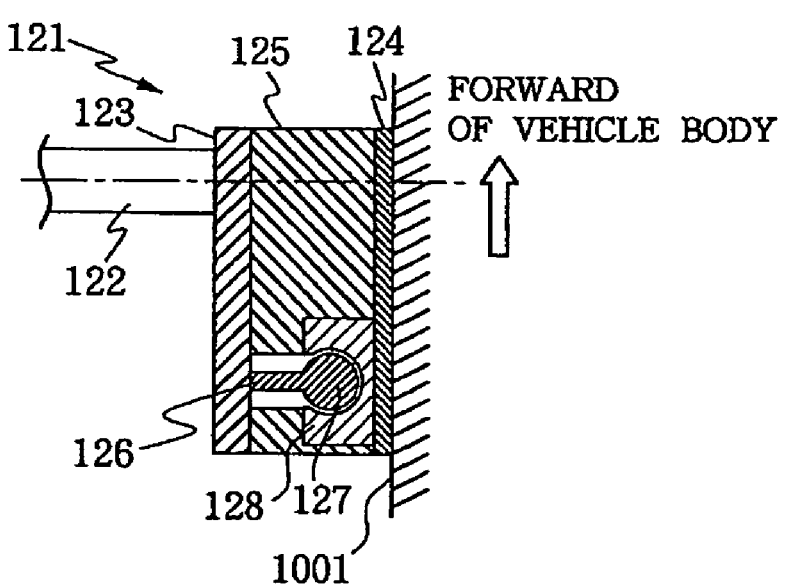
FIG. 14 is a sectional view of an axle with rubber cushions according to another embodiment of the present invention.

In the axle with rubber cushions 121 according to still another embodiment of the present invention, as shown in FIG. 14, the cylindrical protruded part 126 is protruded in a further backwardly offset manner with respect to the spindle part, and a spherical part 127 is provided on the tip part 7 thereof. Rubber cushions 125 are disposed between a disk body 123 and a fitting plate 124, a spherical bearing 128 fixed to the fitting plate 124 is largely offset backwardly with respect to the spindle part 122, and the spherical bearing 128 and the spindle part 122 are positioned in each end area of the disk body 123 across the axis thereof. As described above, the toe-in can be positively realized by setting the offset to be larger.

Figure 15:
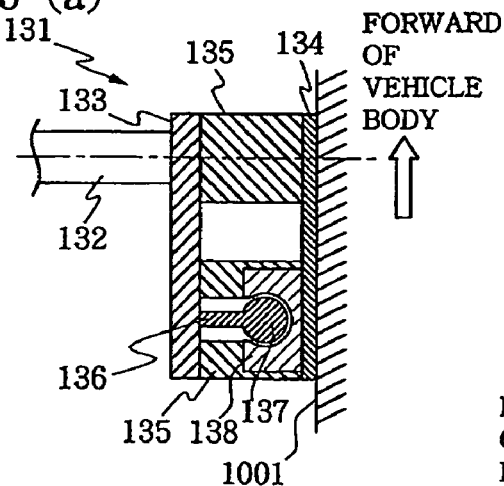
FIG. 15 is a sectional view of an axle with rubber cushions according to still another embodiment of the present invention.
Figure 15:
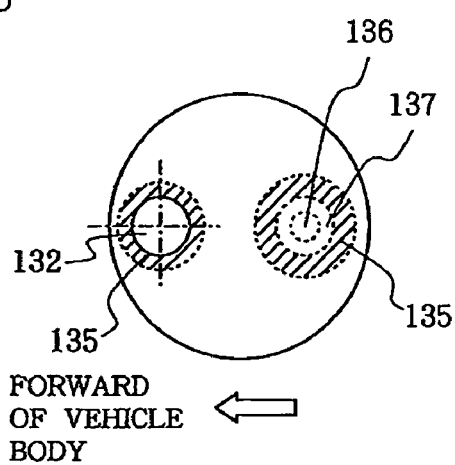

In an axle with rubber cushions 131 according to still another embodiment of the present invention, as shown in FIG. 15, the spherical bearing 138 is largely offset with respect to a spindle part 132, and similar to the case of the preferred embodiment shown in FIG. 14, the spherical bearing 138 and the spindle part 132 are positioned in each end area of a disk body 133 across the axis thereof. Here, the rubber cushions 135 are divided into two in the longitudinal direction of the car as shown in a side view (b) from the spindle direction in FIG. 15(a), and disposed in areas corresponding to the arrangement areas of the cylindrical protruded part 136, the spherical part 137, and the spindle part 132. As described above, rigidity difference can be easily given to the front and rear rubber cushions 135 by dividing the rubber cushions 135.

Figure 16:
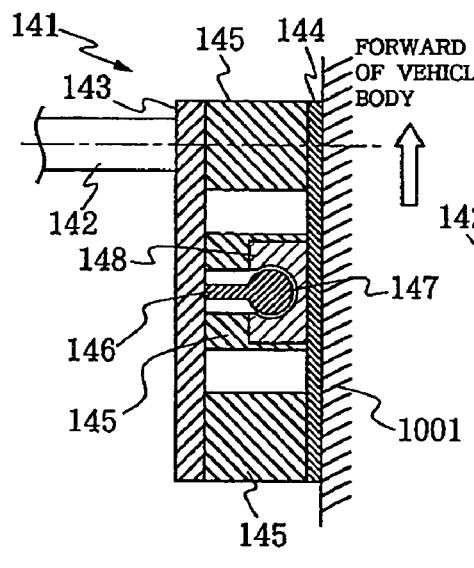
FIG. 16 is a sectional view of an axle with rubber cushions according to still another embodiment of the present invention.
Figure 16:
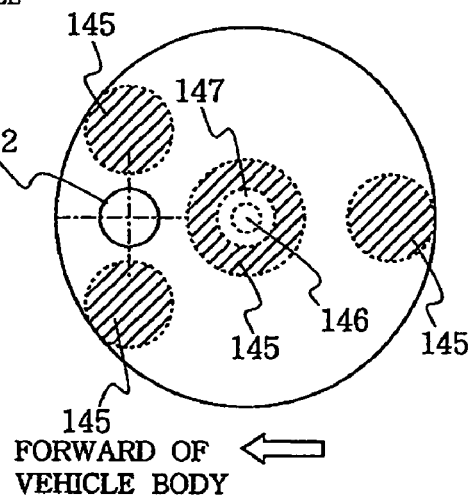

In an axle with rubber cushions 141 according to still another embodiment of the present invention, as shown in FIG. 16, the spherical bearing 148 is offset backwardly with respect to the spindle part 142, rubber cushions 145 are divided into four as shown in the side view (b) from the spindle direction of FIG. 16(a), and disposed on the arrangement parts, etc. of the cylindrical protruded part 146 and the spherical part 147 between a disk body 143 and a fitting plate 144. Methods to give rigidity difference in the rubber cushions 145 include a method for dividing the rubber cushions 145 into pieces, and a method for changing the rubber hardness, and may be adequately determined according to the car kind or the like.

Figure 17:
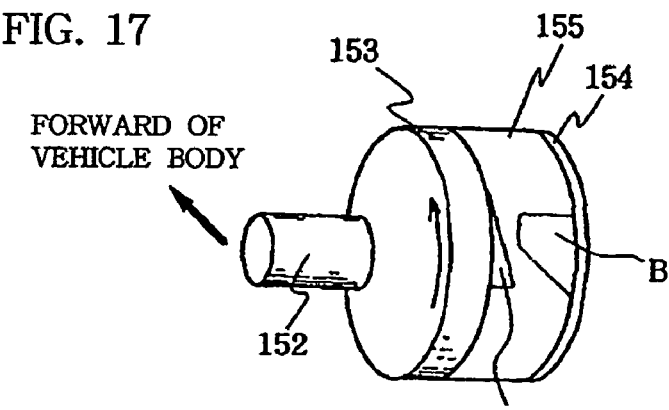
FIG. 17 is a perspective view to show a rear side part of the rubber cushions of an axle with rubber cushions according to still another embodiment of the present invention.
Figure 18:
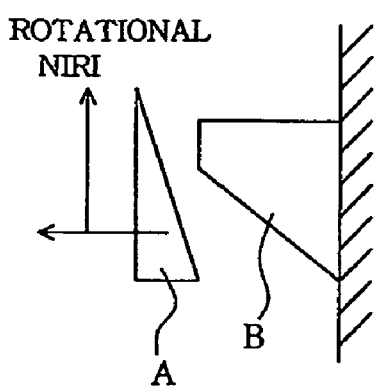
FIG. 18 is an illustration to indicate the working direction of an engagement member.

According to still another preferred embodiment of the present invention, as shown in FIG. 17, a pair of engagement members A and B are installed on an outer edge part of a disk part 153 and an outer edge part of a fitting plate 154 fixed to a spindle part 152 on a rear side surface of the car of rubber cushions 155, and when the disk body 153 is rotated when the braking torque is generated, the engagement members A and B are engaged with each other to push out the disk body 153 outward of the axle in an engagement part. For this purpose, the engagement members A and B have a slidable shape as shown in FIG. 18 so that the input in the rotational direction is converted in the force in the direction outward of the axle when the engagement member A is abutted on the engagement member B by the rotation when the braking torque is generated. By providing these engagement members A and B, the toe-in can be positively realized when the braking torque is generated.

The above-described axle with rubber cushions 101 of the present invention can be applied to a known torsion beam axle type suspension device, for example, as shown in FIG. 29, a torsion beam axle type suspension device comprising a pair of trailing arms 1001 which are spaced from each other axially of the axle, and connected to a car body at front ends, and rotatably support wheels at rear ends, and a torsion beam 1002 which extends axially of the axle and interconnect the pair of trailing arms 1001 by connection parts at both ends, and the axle with rubber cushions of the present invention is fitted to an axle part 1006 at rear ends of the trailing arms 1001.

Figure 19:
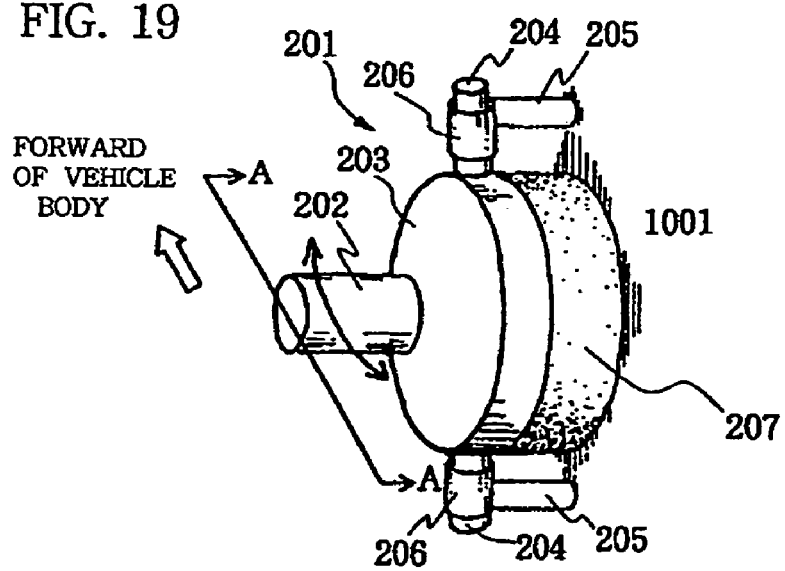
FIG. 19 is a perspective view of an axle with rubber cushions according to still another embodiment of the present invention.

In addition, FIG. 19 shows an axle with rubber cushions 201 according to another embodiment of the present invention. The axle 201 with rubber according to the preferred embodiment shown in FIG. 19 comprises a metal spindle part 202 and a support plate 203 with this spindle part 202 fixed to an outer surface thereof. The spindle part 202 may be fixed to the support plate 203 by welding, or screwing or press-fitting and fixing in a hole part formed in the support plate 203, or the spindle part and the support plate may be integrated with each other.

The support plate 203 has shaft parts 204 protruded from upper and lower sides. These shaft parts 204 can also be provided on the support plate 203 by means of screwing or the like. The pair of shaft parts 204 are penetrated through a cylindrical opening part 206 formed in tips of a pair of arms 205 extending from the trailing arms 1001, or an axle fitting plate (not shown) to the trailing arms 1001, and rotatably supported. In the preferred embodiment shown in the figure, a pair of shaft parts 204 are offset backwardly with respect to the spindle part 202. The toe change at a turning outer wheel is suppressed thereby, and the toe-in can be realized.

Rubber cushions 207 are disposed on an inner surface of the support plate 203. These rubber cushions 207 are adhered to the inner surface of the support plate 203, and the side surfaces of the trailing arms 1001 or an axle fitting plate (not shown) to the trailing arms 1001 by means of vulcanization bonding or the like, but need not be adhered to necessarily adhered to the trailing arms 1001, and they may be simply pressed thereagainst. The thickness of the rubber cushions 207 can be adequately selected according to the space of the axle part and the requested vibration isolating characteristic.

The rubber cushions 207 which can be used for the present invention may be a known one as the rubber cushions. For example, the rubber elastic bodies can be prepared by adequately blending adequate compounding agents such as, sulfur, vulcanization accelerator, aging preventer and carbon black in natural rubber and synthetic rubber, such as diene rubber including butadiene rubber, styrene butadiene copolymer rubber, and butyl rubber. The JIS-A hardness (Hd) of these rubber elastic bodies is preferably 30° to 80° from the viewpoint of the vibration absorption characteristic and the durability, and the modulus of elasticity thereof is preferably $1 \times 10^3$ to $1 \times 10^5$ N/cm$^2$.

By providing the axle 201 with rubber according to the preferred embodiment of the present invention on side surfaces of the trailing arms 1001, the vibration isolating property is demonstrated by the effect of the rubber cushions 207 without raising problems about cost, weight and space, the vibrational ride quality performance is improved, and the toe change to the cornering force can be positively realized in the toe-in direction on the turning outer wheel.

Figure 20:
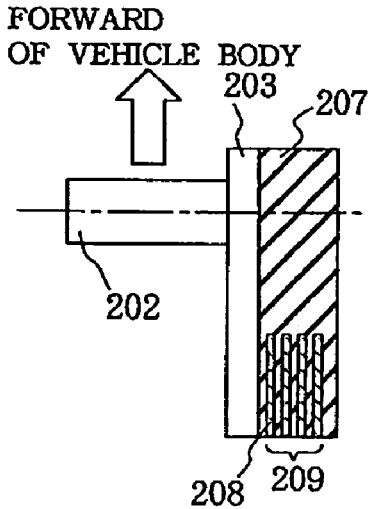
FIG. 20 is a sectional view along A—A direction shown in FIG. 19.

Further, according to another preferred embodiment of the present invention, the rigidity of the rubber cushions 207 at the front side of the car is set to be lower than that at the rear side. By this configuration, the toe-in can be positively realized during the cornering. More specifically, a method for forming a laminate structural body 209 comprising metal plates 208 and the rubber cushions on the rubber cushions 207 at a rear side of the car. FIG. 20 is a sectional view along A—A in the arrow direction of the axle with rubber cushions 201 shown in FIG. 19. As shown in FIG. 20, the metal plates 208 are disposed in an area of the rubber cushions 207 in the rear side of the car. In an example in the figure, the number of lamination of the metal plates 208 is four. This number can be adequately selected according to the car kind or the like, and preferably at least two. Similarly, the size and the arrangement area of the metal plates 208 are adequately selected according to the desired rigidity ratio to the front rigidity.

Figure 21:
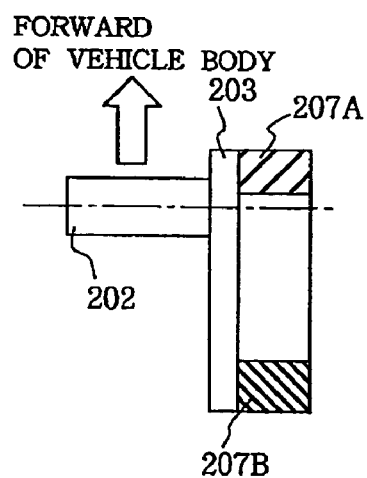
FIG. 21 is a sectional view along A—A direction shown in FIG. 19; according to still another embodiment of the present invention.

Alternatively, as shown in FIG. 21, the rubber cushions 207 are divided into two or more in the longitudinal direction, and, for example, the rigidity difference may be given by setting the rigidity of the two-divided rubber cushions 207A and 207B so that the rigidity of the front rubber cushion 207A is lower than that of the rubber cushion 207B on the rear side of the car. Methods to give rigidity difference in the rubber cushions include a method for changing the rubber hardness between the front and rear rubber cushions, and a method for changing the rubber volume between the front and rear volumes. The degree of the rigidity difference may be adequately determined according to the car kind or the like.

Figure 22:
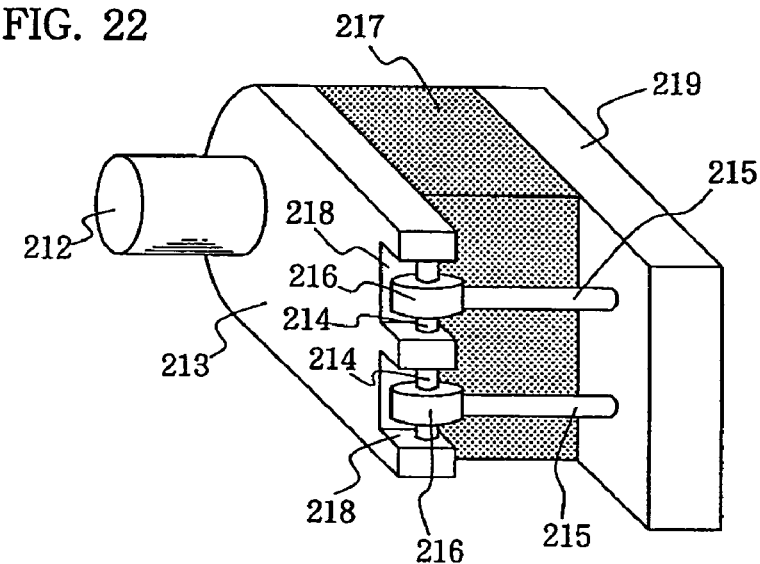
FIG. 22 is a perspective view of an axle with rubber cushions according to still another embodiment of the present invention.

According to another preferred embodiment of the present invention, as shown in FIG. 22, a spindle part 21 is fixed to an outer surface of a support plate 213, and a recessed part 218 is formed at a rear end part, and a shaft part 214 is stretched over the recessed part 218 in the vertical direction. The other end of an arm 15 to pivotably support this shaft part 214 is fixed to trailing arms (not shown) or an axle fitting plate 219 to the trailing arms by screwing or the like. The support plate 213 is rotatably supported by a rear end thereof by penetrating the shaft part 214 into a cylindrical opening part 216 formed in a tip of the arm 215. One or three or more arms 215 may be acceptable, and two arms are preferable. Rubber cushions 217 are interposed between an inner surface of the support plate 213 and the axle fitting plate 219, or may be directly interposed between the trailing arms (not shown) without providing the axle fitting plate 219. However, in this case, the arms 215 are directly fixed to the trailing arms. As described above, by pivotally supporting the support plate 213 by the rear end, toe change at a turning outer wheel is suppressed, and the toe-in can be realized.

According to still another preferred embodiment of the present invention, a vibration isolating bush (not shown) may be provided between shaft parts 204 and 214, and cylindrical opening parts 206 and 216 provided on tips of arms 205 and 215. Such the vibration isolating bush may include those which are extensively used in suspension of cars, and a known vibration isolating bush with a rubber elastic body interposed between outer and inner cylinders concentric with each other may be employed. The vibration isolating bush is press-fitted in and fixed to cylindrical opening parts 206 and 216, and the shaft parts 204 and 214 are penetrated in the inner cylinder. As described above, by applying the vibration isolating bush to the shaft parts 204 and 214, the vibration isolating property by the vibration isolating bush is demonstrated, and the vibrational ride quality performance can be double-improved in the axle part together with rubber cushions 207 and 217.

The above axle with rubber cushions of the present invention can be applied to a known torsion beam axle type suspension device, for example, a torsion beam axle type suspension device comprising a pair of trailing arms 1001 which are spaced from each other axially of the axle, and connected to a car body at front parts, and rotatably support wheels at rear ends and torsion beam 1002 which extends in the axial direction and interconnects the pair of trailing arms 1001 by connection parts at both ends as shown in FIG. 29, and the axle with rubber cushions of the present invention is fitted to an axle part 1006 at rear ends of the trailing arms 1001.

Figure 23:
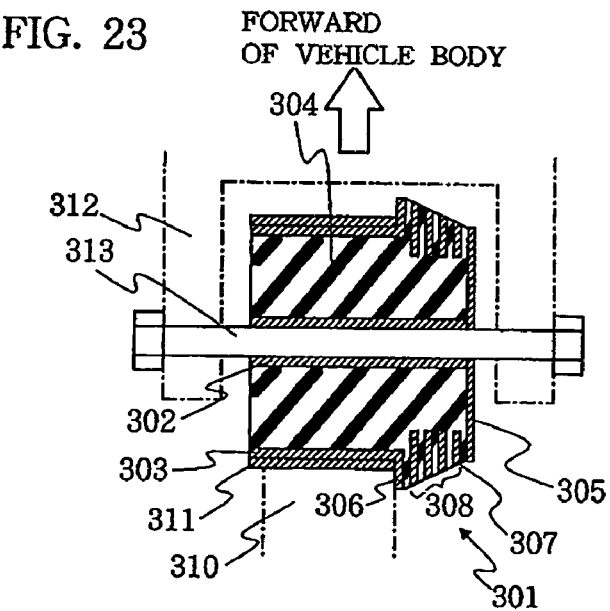
FIG. 23 is a sectional view of a vibration isolating bush according to an embodiment of the present invention.

Still further, the vibration isolating bush 301 for the torsion beam axle type suspension device according to an embodiment of the present invention shown in FIG. 23 is press-fitted in and fixed to the cylindrical opening part 311 formed axially of the axle at front ends of the pair of trailing arms 310 spaced from each other axially of the axle.

In the vibration isolating bush 301 according to the preferred embodiment shown in the figure, a rubber elastic body 304 of a predetermined thickness is vulcanization-bonded between an outer cylinder 303 and an inner cylinder 302 concentric with each other, and flanges 305 and 306 with the inner cylinder 302 extending outward of the outer cylinder 303 are provided on each one end on the same-side of the inner metal cylinder 302 and the outer metal cylinder 303. A part of the rubber elastic body present in a space formed between the flanges 305 and 306 forms a laminate structural body 308 together with metal plates 307 and the rubber elastic body 304.

FIG. 24 is a side view of the vibration isolating bush 301 shown in FIG. 23 from the direction of the flanges 305 and 306, and as shown in FIG. 24, the metal plates 307 are disposed symmetrical to each other in the longitudinal direction of the car. In the illustration, the number of laminates of the metal plates 307 is four, or may be adequately selected according to the car kind or the like, and preferably at least two. Similarly, the size and the arrangement area of the metal plates 307 can be adequately selected according to a desired ratio of the rigidity in the longitudinal direction to the rigidity in the right-to-left and perpendicular axis.

The material of the vibration isolating bush 301 may include those extensively used in car suspensions, and the rubber elastic body 304 can include known ones as the rubber cushions. For example, the rubber elastic body can be prepared by adequately blending adequate compounding agents such as, sulfur, vulcanization accelerator, aging preventer and carbon black in natural rubber and synthetic rubber, such as diene rubber including butadiene rubber, styrene butadiene copolymer rubber, and butyl rubber. The JIS-A hardness (Hd) of these rubber elastic bodies is preferably 30° to 80° from the viewpoint of the vibration absorption characteristic and the durability, and the modulus of elasticity thereof is preferably $1 \times 10^3$ to $1 \times 10^5$ N/cm$^2$.

In the vibration isolating bush 301, a shaft body of a bracket 312 of a car body (not shown), for example, a bolt 313 is penetrated through the inner cylinder 302. The trailing arms 310 are connected to the car body in a rocking manner, and the ratio of the rigidity in the shear direction to the rigidity in the axial direction is considerably increased by the laminate structural body 308 compared with that of a single rubber elastic body. As a result, the toe change to the cornering force can be suppressed without degrading the vibrational ride quality performance.

Next, FIG. 25 shows a part of a vibration isolating bush 321 for the torsion beam axle type suspension device according to another embodiment of the present invention. In the vibration isolating bush 321 according to the preferred embodiment shown in the figure, a rubber elastic body 324 of a specified thickness is vulcanization-bonded between an outer cylinder 323 and an inner cylinder 322 concentric with each other, flanges 325 and 326 are provided on one end on the same side of these inner metal cylinder 322 and the outer metal cylinder 323 with the inner cylinder 322 in the concentric axial direction extending outward of the outer cylinder 323, and a part of the rubber elastic body present in a space between the flanges 325 and the flange 326 forms a laminate structural body 328 together with metal plates 327 and the rubber elastic body 324. These are similar to those according to the preferred embodiment shown in FIG. 23. In the preferred embodiment shown in FIG. 25, the metal plates 327 (front parts of the car when connected to the car) are inclined outward of the normal direction of the axis of the inner cylinder. By inclining the metal plates like this, the input can be dispersed outward of the inclination so as to prevent the force applied to the toe-out trend in the turning outer wheel, and the toe change to the cornering force can be suppressed positively. The angle of inclination may be adequately determined taking into consideration the suppression of the toe change, the space of the brackets, or the like.

Figure 26:
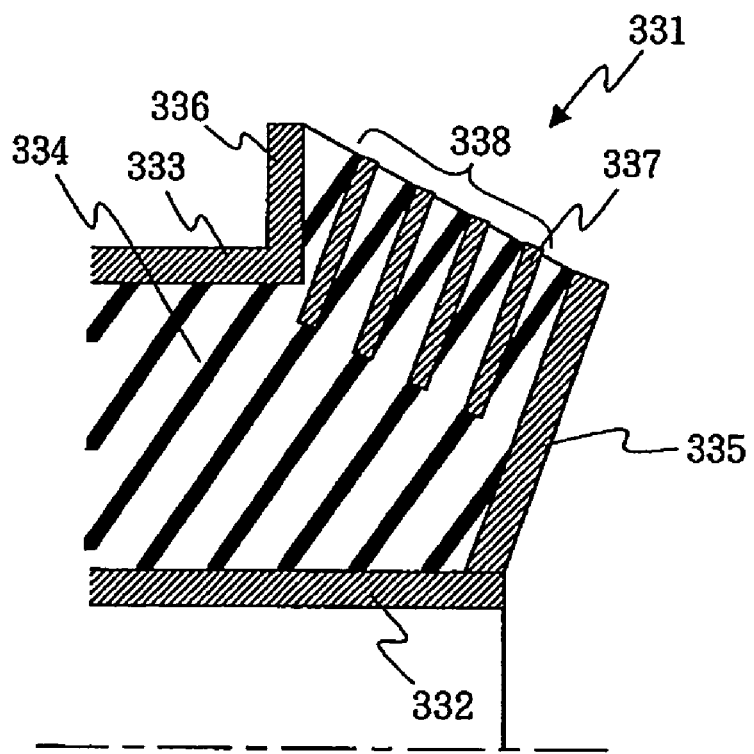
FIG. 26 is a sectional view of a vibration isolating bush according to still another embodiment of the present invention.
Figure 27:
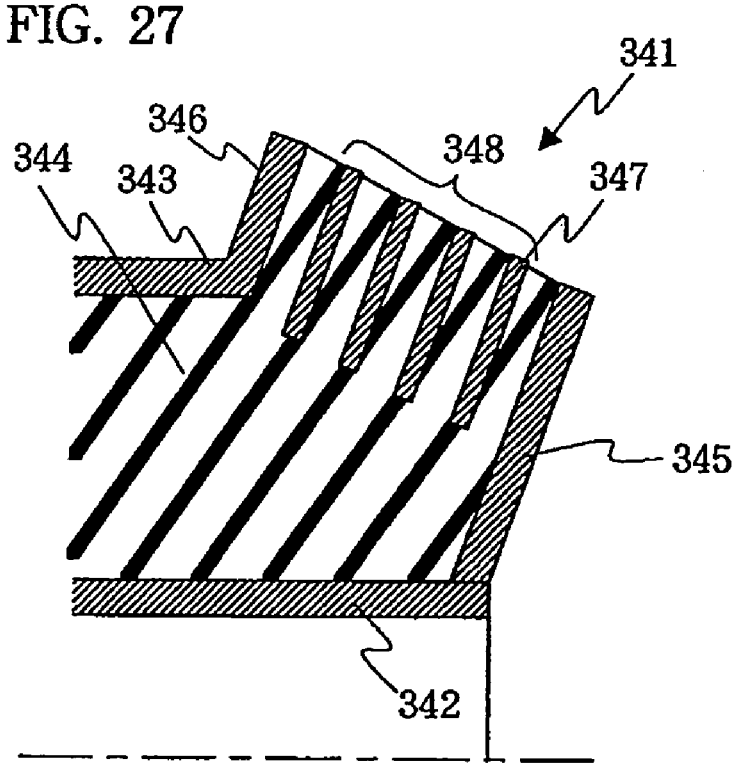
FIG. 27 is a sectional view of a vibration isolating bush according to still another embodiment of the present invention.

Vibration isolating bush 331 and 341 for the torsion beam axle type suspension device according to still another embodiment of the present invention shown in FIG. 26 and FIG. 27 are similar to those according to the preferred embodiment shown in FIG. 25 except that a flange 336 of an outer cylinder 333 inclines only a part of the flange 335 of the inner cylinder 332 as illustrated in FIG. 25 (FIG. 26), or, both a part of a flange 345 of an inner cylinder 342 and a part of a flange 346 of an outer cylinder 343 (FIG. 27) at the same angle as that of metal plates 337 and 347 outwardly, and laminate structural bodies 338 and 348 are formed between the rubber elastic bodies 334 and 344, and the similar effect to the above can be obtained thereby.

The vibration isolating bush of the present invention can be applied to a known torsion beam axle type suspension device, i.e., a torsion beam axle type suspension device comprising the pair of trailing arms 1001 spaced each other axially of the axle, and connected to a car body at front ends, and rotatably supporting wheels at rear ends as shown in FIG. 29, and a torsion beam 1002 extending axially of the axle and interconnecting the pair of trailing arms 1001 by connecting portions at both ends, and front ends of the trailing arms 1001 are connected to brackets 1004 of the car body in a rocking manner through the vibration isolating bushes of the present invention. In this case, it is important to arrange the laminate structural body of the metal plates and the rubber elastic body of the vibration isolating bushes in the forward direction of the car. The toe change to the cornering force can be suppressed without degrading the vibrational ride quality performance thereby.

INDUSTRIAL APPLICABILITY

As described above, according to the torsion beam type suspension device of the present invention, the steering stability and the ride quality performance can be improved without impairing characteristic requests about cost, weight and space.

Further, according to the axle with rubber cushions of the present invention, and the torsion beam axle type suspension device using the axle, the steering stability, the traveling stability, and the vibrational ride quality performance can be compatibly performed without impairing characteristic requests about cost, weight and space.

Still further, according to the vibration isolating bushes of the present invention, and the torsion beam axle type suspension device using it, the steering stability, the traveling stability and the vibrational ride quality performance can be compatibly performed without impairing characteristic requests about cost, weight and space.

The invention claimed is:

1. A torsion beam type suspension device comprising: a pair of trailing arms spaced from each other axially of an axle, and connected to a car body at front ends, and rotatably supporting wheels at rear ends of said trailing arms through brackets; and a torsion beam extending axially of the axle and interconnecting the pair of trailing arms at both ends,
wherein the rear ends of the pair of trailing arms are connected to the brackets through rubber cushions in a rocking manner,
wherein the rubber cushions are interposed between an outer cylinder and an inner cylinder concentric with each other to constitute vibration isolating bushes, and
wherein a pair of protruded parts are protruded from front and rear parts of the brackets in an inward direction of the axle, two cylindrical opening parts continuously arranged axially of the axle are respectively formed in the pair of protruded parts in a longitudinal direction, the vibration isolating bushes are press-fitted in and fixed to the cylindrical opening parts, two cylindrical protruded parts extending backward of the trailing arms are penetrated through the inner cylinders of front and rear vibration isolating bushes arranged in the longitudinal direction, and the rigidity of the front vibration isolating bush is set to be lower than the rigidity of the rear vibration isolating bush.

2. A torsion beam type suspension device according to claim 1, wherein a stopper is installed on both a root part and a tip part of the cylindrical protruded parts extending backward of the trailing arms.

3. A torsion beam type suspension device according to claim 1, wherein an axial direction of either of, or each of the front vibration isolating bushes and the rear vibration isolating bushes is inclined relative to a longitudinal axis of a car.

4. A torsion beam type suspension device according to claim 1, wherein the front ends of the trailing arms are connected to brackets on the car body in a rocking manner through vibration isolating bushes.

5. A torsion beam type suspension device comprising: a pair of trailing arms spaced from each other axially of an axle, and connected to a car body at front ends, and rotatably supporting wheels at rear ends of said trailing arms through brackets; and a torsion beam extending axially of the axle and interconnecting the pair of trailing arms at both ends,
wherein the rear ends of the pair of trailing arms are connected to the brackets through rubber cushions in a rocking manner,
wherein the rubber cushions are interposed between an outer cylinder and an inner cylinder concentric with each other to constitute vibration isolating bushes, and
wherein a pair of protruded parts are protruded from front and rear parts of the brackets in an inward direction of the axle, the vibration isolating bushes are press-fitted in and fixed to cylindrical opening parts in a longitudinal direction which are respectively formed in the pair of protruded parts, one cylindrical protruded part extending backward of the trailing arms is penetrated through the inner cylinders of front and rear vibration isolating bushes arranged in the longitudinal direction, and the rigidity of the front vibration isolating bush is set to be lower than the rigidity of the rear vibration isolating bush.

6. A torsion beam type suspension device according to claim 5, wherein a stopper is installed on both a root part and a tip part of the cylindrical protruded parts extending backward of the trailing arms.

7. A torsion beam type suspension device according to claim 5, wherein an axial direction of either of, or each of the front vibration isolating bushes and the rear vibration isolating bushes is inclined relative to a longitudinal axis of a car.

8. A torsion beam type suspension device according to claim 5, wherein the front ends of the trailing arms are connected to brackets on the car body in a rocking manner through vibration isolating bushes.

* * * * *